No. 685,644. Patented Oct. 29, 1901.
D. M. ROBERTS & J. H. MARA.
DOUBLE ACTION SAW SET.
(Application filed June 7, 1901.)
(No Model.)
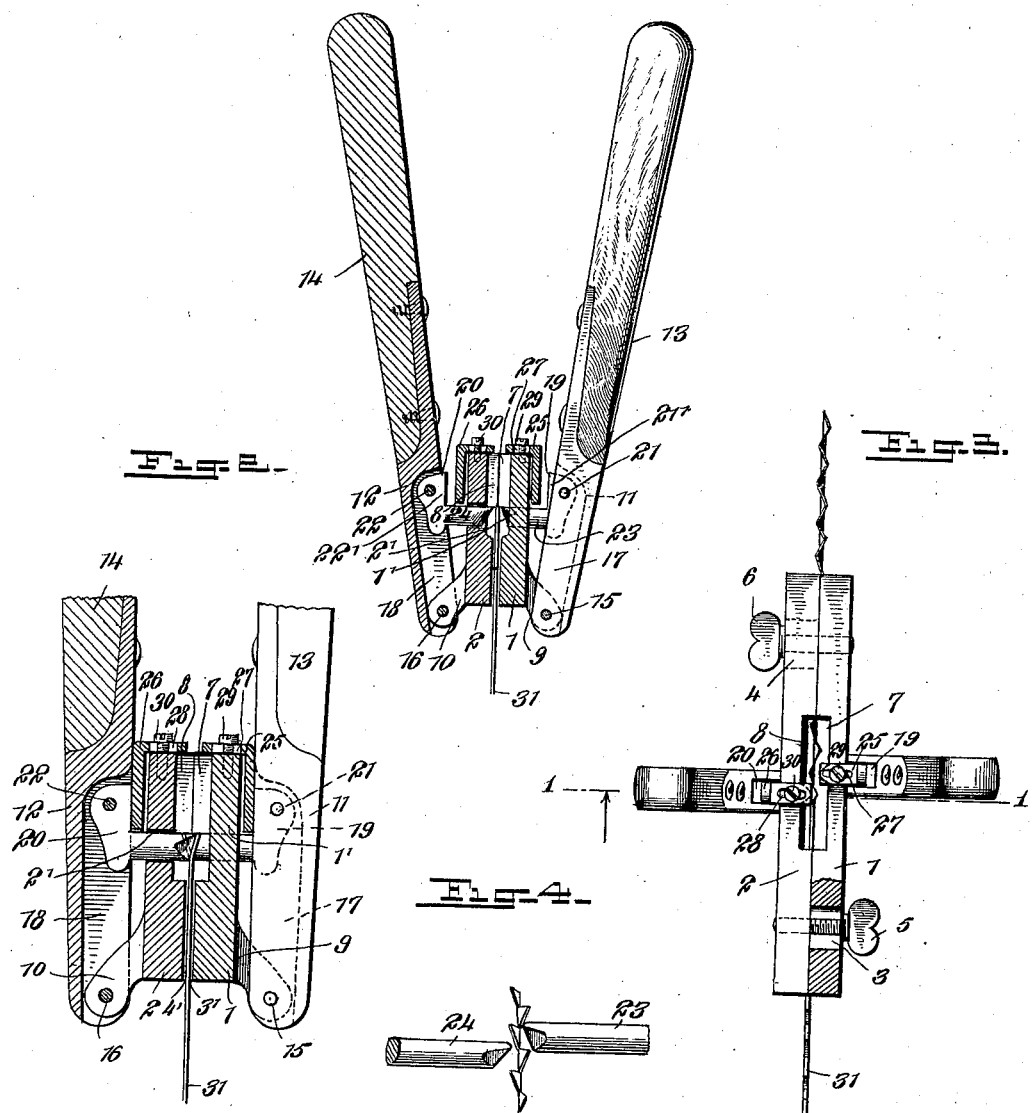
WITNESSES:
INVENTORS
Duane M. Roberts
Joseph H. Mara
BY
ATTORNEYS

UNITED STATES PATENT OFFICE.

DUANE MORTIMER ROBERTS AND JOSEPH HENRY MARA, OF MARLOW, INDIAN TERRITORY.

DOUBLE-ACTION SAW-SET.

SPECIFICATION forming part of Letters Patent No. 685,644, dated October 29, 1901.

Application filed June 7, 1901. Serial No. 63,556. (No model.)

*To all whom it may concern:*

Be it known that we, DUANE MORTIMER ROBERTS and JOSEPH HENRY MARA, citizens of the United States, and residents of Marlow, in the Chickasaw Nation, Indian Territory, have invented a new and Improved Double-Action Saw-Set, of which the following is a full, clear, and exact description.

Our invention relates to double-action saw-sets, sometimes called "saw-wrests," and more particularly to the small machines or tools which are operated by hand for the purpose of bending the teeth of the saw to the proper angle. It will be understood, of course, that in every saw either all of the teeth or certain alternate teeth must be bent outward from the imaginary plane passing through the saw-blade, and this operation is necessary both in new saws and in those in which through use in sawing the teeth have been closed or partially closed by the pressure of the material sawed. Our device also prevents buckling of the saw, as hereinafter explained.

Reference is to be had to the accompanying drawings, forming a part of this specification, in which similar characters of reference indicate corresponding parts in all the figures.

Figure 1 represents a side elevation of our saw-set, partly in section, upon the line 1 1 of Fig. 3. Fig. 2 is a somewhat similar view, slightly enlarged, the handles being represented as broken away. Fig. 3 is a plan view, partly in section; and Fig. 4 is a detail in perspective, showing the setting-punches, together with the manner of their application to the teeth of the saw.

The entire structure except the handles is made, preferably, of metal.

Two similar blocks 1 2 are each provided longitudinally with a slot 3 4, through which a fastening, preferably thumb-screws 5 6, passes loosely and is firmly secured in the opposing block. By loosening both screws, sliding one block slightly upon the other, and tightening the screws the blocks can be adjusted longitudinally upon each other within reasonable limits, depending upon the length of the slots 3 4. Each block 1 2 is also partially cut away, so as to form a hollow space 7 8, said open spaces preferably registering together when the blocks are in the relative position shown in Fig. 3. Each block 1 2 is further provided with a hole 1' 2', the object of which will appear below. These holes are in staggering relation to each other when the blocks are in the position shown in Fig. 3. Each block is provided with another slot 3' 4', passing entirely throughout the length of the block and so arranged that when placed together said slots will register with each other and form a kerf-like slot, into which the blade of the saw can be inserted, as shown in Figs. 1, 2, and 3.

Mounted upon each block is a bracket 9 10, upon which the handle-irons 11 12, carrying the handles 13 14, are pivoted by means of the pins 15 16. The said handle-irons 11 12 are each provided with a slot 17 18, adapted to receive the brackets 9 10 and also to receive the heads 19 20, which are pivoted in said slots by means of the pins 21 22. These pins, like the pins 15 16, may pass entirely through the handle-irons, if desired. Each of the pivoted heads 19 20 is provided with a projection 23 24 integral therewith, said parts together constituting a punch. The projections 23 24 pass through the respective holes 1' 2' in the blocks 1 2 and, like the holes, miss each other and stand in a staggering relation when the blocks occupy the position shown in Fig. 3. When, however, the blocks 1 2 are moved relatively to each other, the relative position of the punches is changed. By this means the punches may be moved toward and from each other within the limit prescribed by the length of the slots 3 4 and may even be adjusted to register with each other, if desired.

We find that a good plan is to make the saw-set adjustable to an extent suitable for handsaws ranging from No. 4 to No. 12, though of course the invention is applicable to any other reasonable range of sizes.

Upon each block is mounted a gage, being preferably an L-shaped bracket 25 26, provided with a slot 27 28, through which passes a set-screw 29 30, by which the L-shaped part may be adjusted upon the block. This gage is for the purpose of limiting the inward movement of the handles 13 14, and thereby limiting the thrust of the punches, so that the punches will bend the saw-teeth to any predetermined degree and will for this purpose be controllable by the screws 29 30. The heads 19 20, upon which the projections are integrally mounted, are each provided with a shoulder 21' 22', which moves directly against the bracket 25 26 until stopped thereby. These brackets should of course be of good material, such as steel, as they are subjected to considerable strain.

The method of using our invention is as follows: A saw 31—say, for instance, a No. 6 handsaw—is placed with the teeth thereof in the kerf-shaped slots 3' 4', the screws 5 6 are loosened, and the blocks 1 2 are adjusted longitudinally by one sliding upon the other until the punches will be exactly as far apart in the longitudinal direction of the blocks as any two successive or alternative teeth of the saw. The blocks are now clamped to each other by tightening the screws 5 6, the gages or brackets 25 26 are adjusted, as above described, to limit the plunge of the punches, and the handles are alternately gripped and released as the blocks (now considered as a body) are moved along the saw by successive steps of the length of two teeth each. The punches are always parallel, for the reason that when the blocks are adjusted each and every part is moved bodily to a position parallel with that which it previously occupied.

Among the general advantages presented by our invention is the fact that in using it no buckling of the saw is likely to occur. In many of the saw-sets heretofore used the action is such as to distort the blade of the saw. In other words, the action of such devices is not entirely local. To bend a tooth requires considerable pressure, and if this pressure be allowed to distribute itself over any part of the blade away from the tooth the saw will buckle. Again, the buckling effect may be somewhat cumulative, so that a slight curvature from each of several teeth may contribute to produce a permanent distortion of the saw. In our device the punches each act as an anvil for the other, so that the pressure of either punch has practically no effect except the local effect in bending a tooth. The kerf-shaped guideway by preventing undue motions of the saw-blade also assists in preventing the saw from buckling.

Our device is light, simple, cheap, and convenient and can be made upon the scale shown in the drawings or upon a larger or smaller scale, if desired.

Various modifications may suggest themselves as occasion offers, all being within the scope of our invention.

Having thus described our invention, we claim as new and desire to secure by Letters Patent—

1. In a saw-set, a pair of oppositely-arranged hand-levers, a pair of oppositely-arranged punches each pivoted to such a lever and provided with a shoulder, an adjustable L-shaped bracket arranged in the path of each of said shoulders, a pair of oppositely-arranged pivotal brackets upon which said levers are respectively mounted, a pair of oppositely-arranged blocks upon which said pivotal brackets and also said adjustable L-shaped brackets are each respectively mounted, in combination with adjustable means whereby the relative position of the said oppositely-arranged blocks may be governed at will.

2. A saw-set, comprising a central body portion, a plurality of levers operatively secured to the same, punches mounted upon said levers and provided with shoulders, and adjustable brackets mounted upon said central body portion for limiting the movements of said shoulders.

3. A saw-set, comprising a central body portion, a plurality of levers operatively secured to the same, punches mounted upon said levers and provided with shoulders, movable brackets mounted upon said body portion for limiting the movements of said shoulders and provided with slots, and screws passing through said slots for adjusting said brackets.

4. A saw-set, comprising a central body portion, levers pivoted upon the same, punches secured to said levers and provided with shoulders, brackets detachably secured to said central body portion and provided with anvil-surfaces for engaging said shoulders, and means for adjusting the position of said brackets relative to said central body portion.

5. A saw-set, comprising a body portion made in sections and provided with guiding-apertures, levers connected with said sections, punches provided with shoulders, loosely mounted upon said levers and extending through said guiding-apertures, and brackets provided with anvil-surfaces for engaging said shoulders of said punches.

6. A saw-set, comprising a body portion made in sections and provided with guiding-apertures, levers connected with said sections, punches provided with shoulders and loosely mounted upon said levers and extending through said guiding-apertures, brackets provided with anvil-surfaces for engaging said shoulders of said punches, and adjusting-screws for securing said brackets in predetermined positions.

7. A saw-set, comprising a central body portion, oppositely-disposed hand-levers pivoted upon the same, punches mounted upon said levers and movable relatively to the same, and means for maintaining the punches in lines parallel with each other.

8. A saw-set, comprising a central body portion provided with apertures for acting as guides, oppositely-disposed hand-levers pivoted upon said body portion, and punches loosely mounted upon said levers and passing through said apertures for the purpose of maintaining the punches in lines parallel with each other at all times.

In testimony whereof we have signed our names to this specification in the presence of two subscribing witnesses.

DUANE MORTIMER ROBERTS.
JOSEPH HENRY MARA.

Witnesses:
GEORGE A. FEAGLES,
JOSEPH C. GOINS.